United States Patent [19]
Kishi et al.

[11] Patent Number: 5,240,283
[45] Date of Patent: Aug. 31, 1993

[54] AIR BAG TYPE OCCUPANT PROTECTOR

[75] Inventors: Kazuo Kishi, Kanagawa; Jun Kato, Tokyo, both of Japan

[73] Assignee: Daicel Chemical Industries, Ltd., Osaka, Japan

[21] Appl. No.: 784,417

[22] PCT Filed: Apr. 25, 1991

[86] PCT No.: PCT/JP91/00565
§ 371 Date: Dec. 16, 1991
§ 102(e) Date: Dec. 16, 1991

[87] PCT Pub. No.: WO91/17070
PCT Pub. Date: Nov. 14, 1991

[30] Foreign Application Priority Data

Apr. 27, 1990 [JP] Japan ................................ 2-113775
Mar. 15, 1991 [JP] Japan ................................ 3-051239

[51] Int. Cl.⁵ ............................................. B60R 21/24
[52] U.S. Cl. ................................ 280/729; 280/731; 280/732; 280/743
[58] Field of Search ............... 280/729, 730, 731, 732, 280/743

[56] References Cited

U.S. PATENT DOCUMENTS

| | | | |
|---|---|---|---|
| 3,642,303 | 2/1972 | Irish et al. | 280/730 |
| 4,262,931 | 4/1981 | Strasser et al. | 280/730 |
| 4,722,551 | 2/1988 | Adams | 280/736 |
| 4,943,086 | 7/1990 | Cunningham | 280/741 |

FOREIGN PATENT DOCUMENTS

47-21048 6/1972 Japan .
50-21246 6/1975 Japan .
61-11084 4/1986 Japan .

*Primary Examiner*—Kenneth R. Rice

[57] ABSTRACT

In an air bag having a structure wherein part of the gas generated from a gas generator inside the air bag is released so as to absorb an impact force on a human body, the present invention provides an air bag type protector for occupant including at least one auxiliary bag from storing the released gas, fitted outside a foundation cloth of the air bag. The apparatus of the present invention makes it possible to reduce the size and weight of a filter device inside the gas generator and hence, to reduce the size and weight of the gas generator as a whole. The auxiliary bag is preferably fitted in such a manner that the upper half of the foundation cloth of the air bag is covered therewith.

10 Claims, 4 Drawing Sheets

AIR BAG TYPE OCCUPANT PROTECTOR

FIELD OF INDUSTRIAL APPLICATION

This invention relates to an air bag or an air bag type occupant protector which operates at the time of crash of a vehicle and protects an occupant of the vehicle. Furthermore, the present invention relates to an auxiliary bag which is fitted to an air bag for protecting an occupant.

PRIOR ART

The air bag type protector of the present invention, for protecting an occupant includes a gas generator which ignites and burns instantaneously a gas generant inside the gas generator upon sensing an impact at the time of crash of an vehicle, to inflate an air bag by the resulting gas and to protect an occupant.

As is well known, the air bag type protector for an occupant includes the gas generator in combination with a bag which is flexible, a volume of the bag being 40 to 60 l for a driver-side seat and 150 to 180 l for passenger-side seats. The gas generator ignites and burns instantaneously the gas generant in the gas generator upon sensing an impact at the time of crash of the vehicle. The air bag inflates and expands by the resulting gas and restrains and protects the occupant. In such an air bag, the bag foundation cloth is temporarily inflated and expanded completely within the time of about 30 msec after the crash. It continuously discharges part of the internal gas through a plurality of vent holes having ordinarily an inner diameter of 20 to 60 mm and disposed at the bottom of the air bag. Such discharges normally occur when the restrained occupant bends forward and presses the air bag such discharges are directed into the vehicle compartment in a direction such that the discharged gas does not blow against the occupant. By discharge of the internal gas, the occupant is prevented from the rebound of the inflated air bag and from a high impact force due to energy absorption. The gas generant in the form of a pellet or a disc is generally used for the gas generator in order to inflate extremely rapidly the air bag. The combustion pressure of the gas generator is elevated to high level in order to shorten the combustion time and for this reason, mist like or fine particulate matter is simultaneously discharged ordinarily with the combustion gas.

According to the prior art technology, since the gas inside the bag is rapidly discharged into the vehicle compartment through the vent holes, the buffer effect against the impact occurring at the time of secondary and tertiary impact or rolling after the first crash is lost completely.

DISCLOSURE OF THE INVENTION

Figure 1:
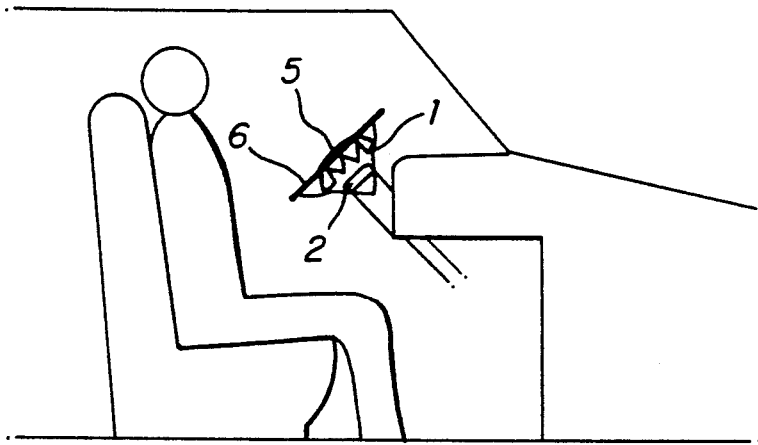
FIG. 1 is a schematic side view showing the construction of an example of a bag apparatus for a driver-side seat of the present invention.

The present invention provides an air bag type protector for an occupant which does not cause any problem even when an extremely limited amount of mist-like or fine particulate matter is emitted outside the gas generator due to insufficient filtration when a filter inside the gas generator is made compact in size and light in weight.

The apparatus of the present invention primarily comprises an acceleration sensor for a sensing crash, a gas generator and an air bag. The air bag has a bag form obtained generally by sewing two foundation cloths at their outer peripheral portions The present invention relates to an air bag.

The inventors of this invention have made intensive studies on the improvement in air bag type protectors for occupant and have found out that the function of the air bag can be exhibited without emitting the resulting bag into the vehicle compartment by disposing air-tight at least one auxiliary bag, which is connected to the outside of vent holes or to gas-passing permeable portions of the air bag. The auxiliary bag is flexible and has a capacity sufficient enough to store the emitted gas until the impact force to an occupant due to impingement is absorbed completely by the air bag (generally, up to 30% of the total gas quantity generated). The auxiliary bag is connected to the air bag, by the use of an adhesive or a sewing thread. This finding has lead to the present invention.

In other words, the present invention relates to an air bag type protector for an occupant which comprises a gas generator, an air bag having a structure wherein the air bag is inflated and expanded by the gas generated from the gas generator, the air bag thereafter releases its stored gas and absorbs the impact force on the human body. The air bag has vent holes, and at least one auxiliary bag for storing the released gas from the air bag through the vent holes, disposed outside the foundation cloth of the air bag.

In other words, the present invention relates to an air bag which is characterized in that an auxiliary bag for storing an emitted gas of an air bag is fitted.

In accordance with the present invention described above, the auxiliary bag for storing the emitted gas from the vent holes of the air bag is fitted to the air bag so as to prevent the gas from being emitted into the vehicle compartment. Accordingly, it is possible to accomplish an air bag apparatus including a gas filter device having a reduced size and weight, or in other words, an air bag apparatus which is small in size and light in weight.

In some cases, the air bag can be an air bag for the driver-side seat and the auxiliary bag is fitted to the outer peripheral portion at the tip of the air bag for the driver-side seat, or the air bag can be an air bag for passenger-side seats and the auxiliary bag is fitted to both side surface portions of the air bag for the passenger-side seats.

According to the present invention, the filter device inside the gas generator can be reduced in size and in weight by connecting and fitting the auxiliary bag to the vent holes for the discharge gas and eventually, the gas generator can be reduced in size and in weight as a whole.

The size and weight of the gas generator can be reduced by fitting the auxiliary bag of the present invention to the air bag, and an air bag having excellent impact absorption functions can be provided.

Materials used for the foundation cloth of the air bag and of the auxiliary bag are woven fabrics consisting of fibers such as Nylon 66, Nylon 6, polyester, aramid, polyamide, etc, non-woven fabrics composed of these fibers, films composed of these materials and films reinforced by these fibers.

Furthermore, the foundation cloth described above is preferably coated with a gas impermeable film such as a synthetic rubber. Various types of synthetic rubbers can be used but a silicone rubber and chloroprene rubber are preferably used from the aspect of their flexibility over a wide range and their flame-retardancy.

Embodiment 1

Hereinafter, the present invention will be explained definitely with reference to the accompanying drawings but the invention is not particularly limited to the examples shown in the drawings.

Figure 3:
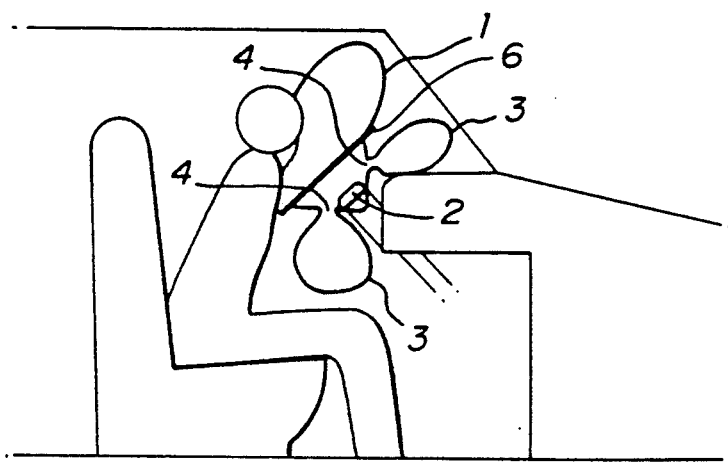
FIG. 3 is a schematic view showing the state of expansion of an auxiliary bag.
Figure 7:
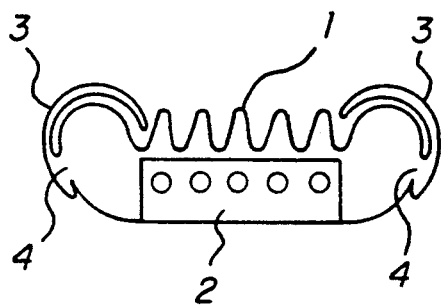
FIG. 7 is a schematic sectional view showing the principal portions of the bag apparatus shown in FIG. 1.

FIGS. 1 and 3 show an example of an air bag type protector for an occupant to be used for a driver-side seat in the present invention. A gas generator 2 used for the present invention is small in size and light in weight. It comprises primarily a gas generant in a quantity sufficient enough to inflate a bag 1, an ignition device and a filter for generated gas, and is positioned inside the bag 1. Such a gas generator 2 is covered on its outer periphery with the bag 1 and is fitted to the center of a steering wheel 6. A cover 5 is above the gas generator 2 (FIG. 1). In the air bag type protector for an occupant of the present invention, an auxiliary bag 3 is connected and fitted to the vent holes 4 of the bag 1 (see FIG. 7). FIG. 7 is a schematic view showing the state of disposition of the folded bag 1 of FIG. 1, the auxiliary bag 3 and the gas generator 2. The auxiliary bag 3 is shown connected to the vent holes 4 of the bag 1.

Figure 2:
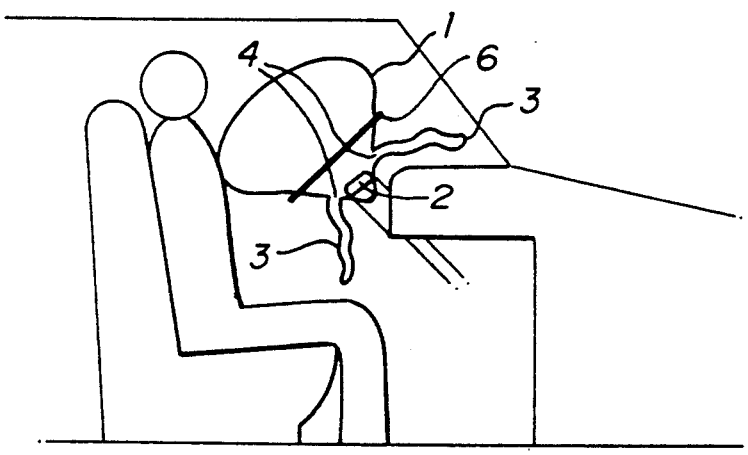
FIG. 2 is a schematic view showing the state immediately after expansion of the bag.

When an automobile collides and an ignition signal is sent to the ignition device, the ignition device ignites and a gas generant starts combustion by the flame of the ignition device. The generated gas containing mist-like or fine particulate combustion products passes through the filter, is filtrated there, then flows into the bag 1 and rapidly inflates and expands the bag 1 as shown in FIG. 2. In this instance, since the internal pressure is low at this stage and since the vent holes 4 exist, the auxiliary bag 3 remains almost folded as shown in FIG. 2. Subsequently, when the state is reached where the human body pushes and smashes the expanded bag 1 in the next stage as shown in FIG. 3, the gas pressure inside the bag rises, so that the gas flows into the auxiliary bag 3 through the vent holes 4 and expands it as shown in FIG. 3. In this case, the bag 1 contracts and restricts the increase of the acceleration that the human body receives. Moreover, since the gas inside the bag is sealed into the bag 1 and the auxiliary bag 3, it does not flow out into the vehicle compartment.

Figure 4:
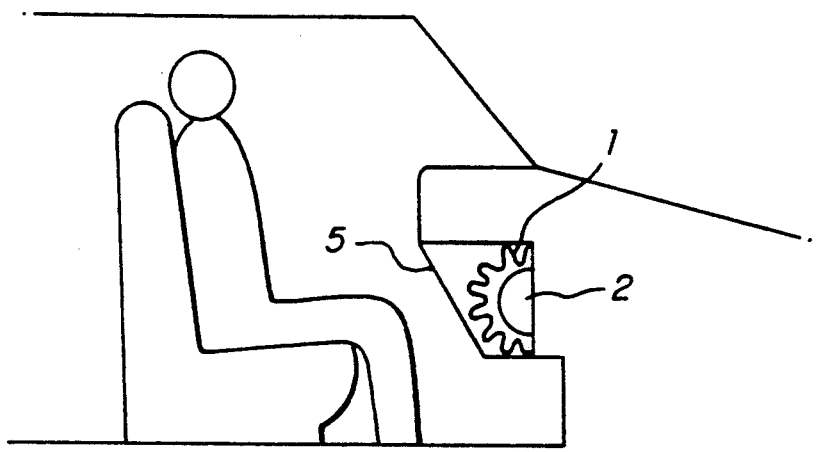
FIG. 4 is a schematic side view showing the construction of an example of a bag apparatus for passenger-side seats of the present invention.
Figure 5:
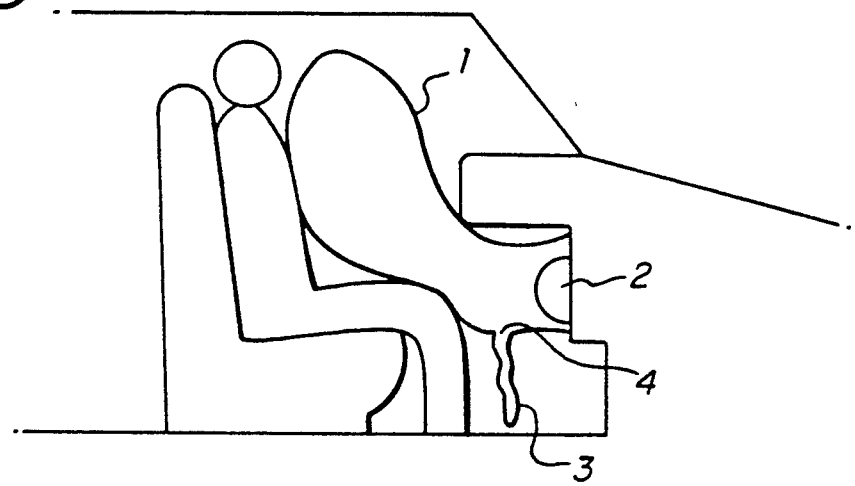
FIG. 5 is a schematic view showing the state immediately after expansion of a bag.
Figure 6:
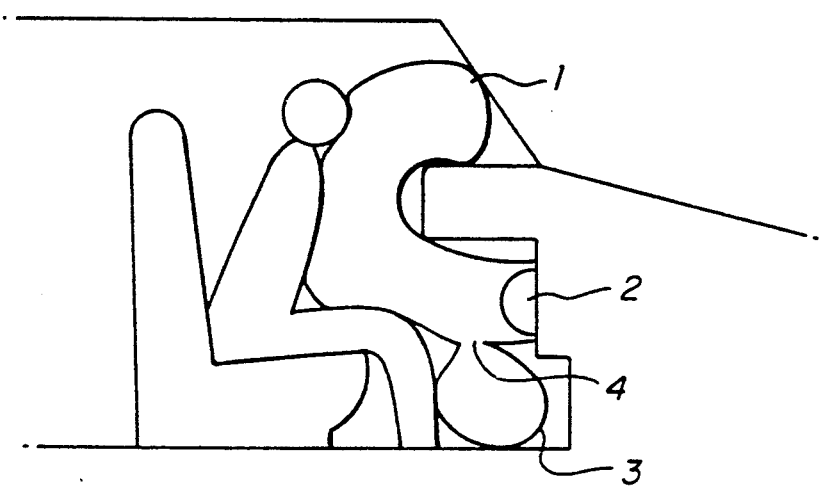
FIG. 6 is a schematic view showing the state at the time of expansion of an auxiliary bag.

FIGS. 4 to 6 show an example of an air bag type protector for occupant to be used for passenger-side seats in the present invention, and its structure and operation are the same as those of the protector shown in FIGS. 1 to 3.

FIG. 7 is a schematic sectional view of the principle portions of the bag apparatus shown in FIG. 1.

Figure 8:
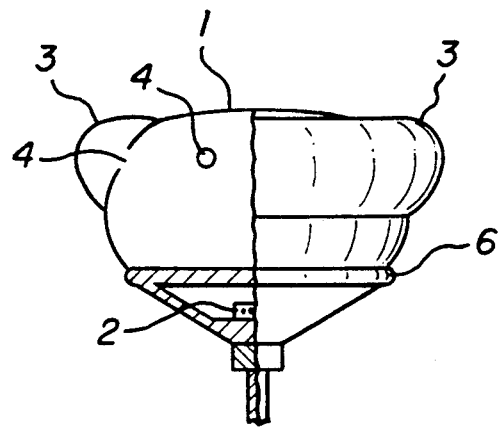
FIG. 8 is a partial schematic sectional view of the auxiliary bag of the invention fitted to the air bag for a driver-side seat.

In FIG. 8, reference numeral 3 denotes a flexible auxiliary bag; 1 is an air bag; 2 is a gas generator; 4 is vent hole; and 6 is a steering wheel.

The material used for the flexible auxiliary bag 3 in the present invention is not particularly limited. Preferably, the material is the same as that of the air bag 1 such as a light-weight gas-impermeable organic polymer film obtained by applying a rubber such as isoprene or a flexible resin film to a woven fabric composed of a high tension organic fiber such as Nylon, Kevlar, or the like.

The gas generant used in the present invention is assembled inside the high combustion pressure gas generator 2. The generator is equipped generally with a filtration mechanism for separating mist-like or fine particulate matter by-products from its combustion. Such a mechanism needs to have only such a separation function that does not damage the bag to an extent of affecting its bag function such as a damage to the film, and the separation function as high as had been conventionally required is not necessary. The gas generant can be used while disposed directly inside the bag so long as the gas generant exhibits sufficient combustibility, such as its combustion is completed within about 30 msec at an atmospheric pressure and the gas generant is almost free from factors which damage the bag functions such as by-products, exothermy, and so forth.

The capacity of the auxiliary bag in the present invention is determined by the volume of the gas emitted via the vent holes 4 from the start of expansion of the air bag until the end of absorption of the first impact, at an atmospheric pressure. Usually, the capacity of the auxiliary bag is up to 30% of the capacity of the generated gas of the mean pressure is 0.5 kg/cm$^2$G and the impact absorption time is up to some dozens of msec. However, this value is merely an approximate value and the capacity of the auxiliary bag is determined by the capacity of the air bag, the impact velocity of the vehicle, the inner diameter of the vent holes, and so forth.

Embodiment 2

Figure 9:
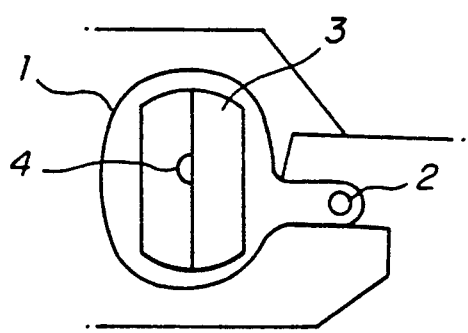
FIG. 9 is a schematic view showing the auxiliary bag of the invention fitted to the air bag for passenger-side seats.
Figure 10:
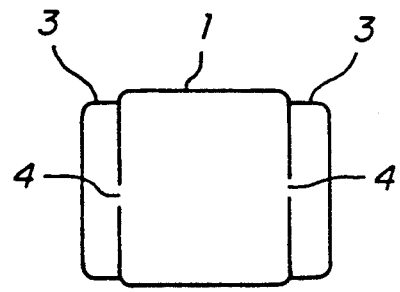
FIG. 10 is a schematic sectional view taken along line A—A of FIG. 9.

In order not to impede the expansion of the air bag and moreover, to effectively absorb the impact force applied to the occupant at the time of crash, the optimum fitting position of the auxiliary bag is the tip outer peripheral portion of the air bag for the driver-side seat (FIG. 8) when the air bag is for the driver-side seat and is at both side surface portions of the air bag for the passenger-side seat (FIGS. 9 and 10) when the air bag is for the passenger-side seat.

Embodiment 3

Figure 11:
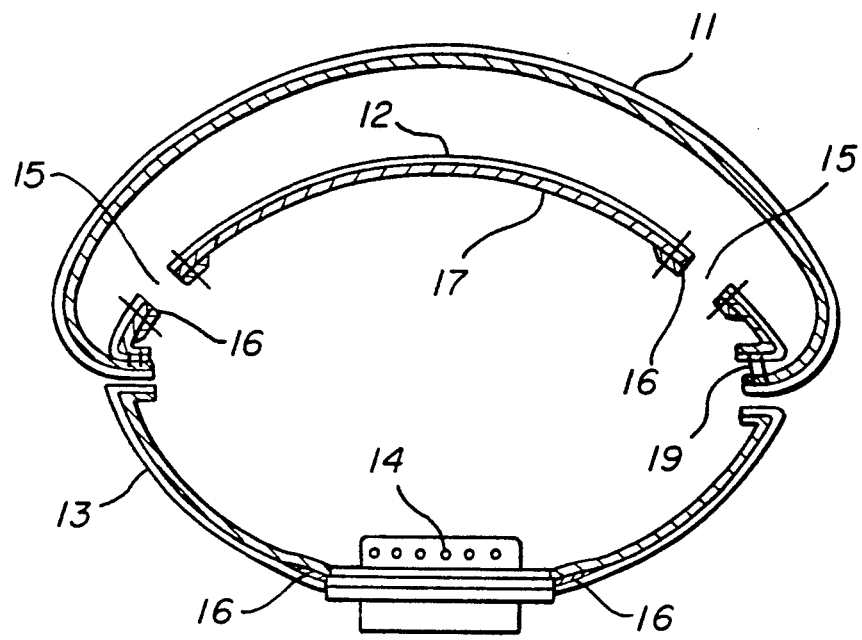
FIG. 11 is a sectional view showing a bag for absorbing impact under an expanded state in another embodiment of the present invention.
Figure 12:
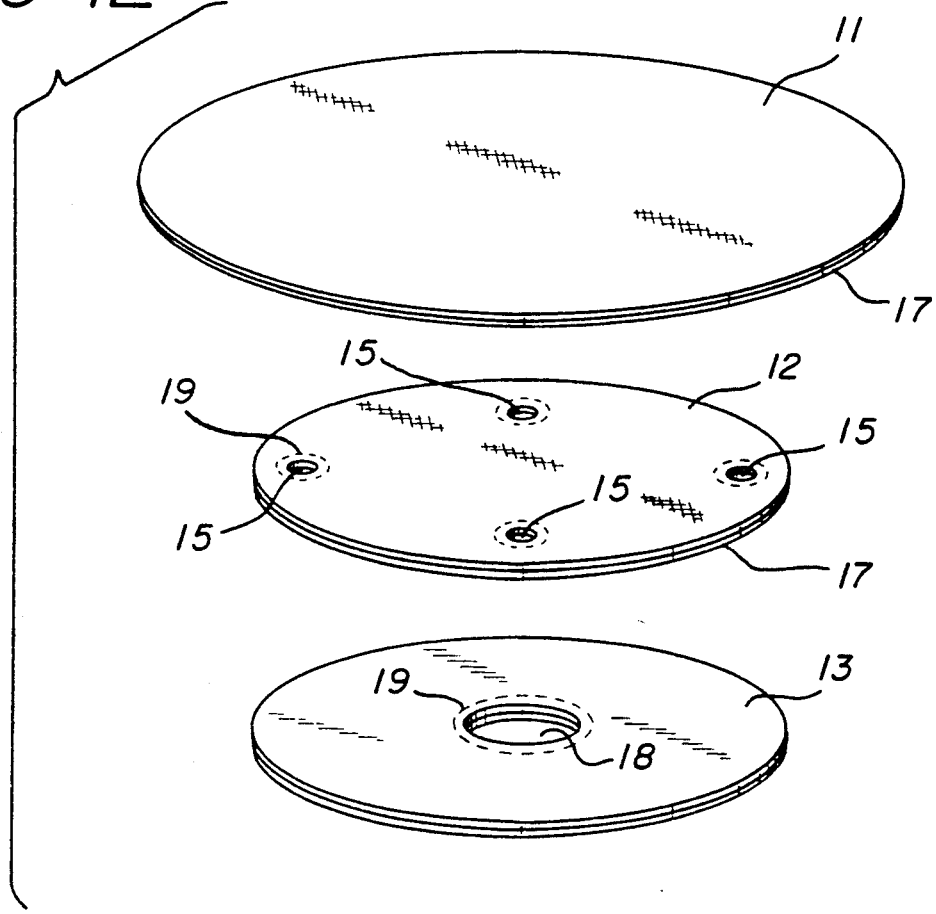
FIG. 12 is a perspective view showing a foundation cloth of the bag of FIG. 11, wherein (a) represents a foundation cloth of an auxiliary bag, (b) does a foundation cloth of an upper portion and (c) does a foundation cloth of a lower portion.

FIG. 11 shows an embodiment of the air bag equipped with the auxiliary bag of the present invention.

The production method of the air bag in the present invention comprises the following steps. First of all, an upper foundation cloth, foundation cloth for auxiliary bag and a lower foundation cloth having a substantially round sectional shape and provided in advance with gas impermeability by a synthetic rubber are each prepared. After they are put one upon another in the order named, they are sewn along the outer peripheries and integrated with one another. In this case, since the outer diameter of the foundation cloth for the auxiliary bag is unavoidably greater than those of the other foundation cloths, the other periphery of the foundation cloth for the auxiliary bag is in advance creased. When the outer periphery of the foundation cloth for the auxiliary bag is aligned with those of the other foundation cloths, the sewing process becomes easier. Furthermore, a treatment for preventing the bag from burning damage is applied in advance to the portion of the auxiliary bag at which it receives a high temperature exhaust gas stream from the vent holes at the time of the expansion of the bag, by increasing the thickness of the synthetic rubber layer, for example. Next, a solution of an unvulcanized rubber is applied to the sewn portion and is then vulcanized for integration. The bag which is integrated in this manner is then turned inside out through the fitting hole for the gas generator, and is thereby completed.

The size of the foundation cloth of the auxiliary bag provides a capacity sufficient enough to store the gas emitted via the vent holes at a normal pressure until the completion of the absorption of the impact by the human body on the bag. In the conventional air bag, the foundation cloth of the bag must be of a sufficient strength to withstand the pressure rise (to about 2 kg/cm$^2$) inside the bag at the time of the operation, but the gas pressure flowing into the auxiliary bag from the vent holes is not much different from the atmospheric pressure. Therefore, the strength of the foundation cloth of the auxiliary bag may be relatively small. However, the volume when the bag is folded is preferably as small as possible and from this aspect, the foundation cloth of the auxiliary bag is made of the same materials as both the upper and lower foundation cloths and are as thin as possible so long as no problem occurs in their strength.

The air bag equipped with the auxiliary bag of the present invention shown in FIG. 11 comprises the foundation cloth of the auxiliary bag 11 having an outer diameter of 95 cm, the upper foundation cloth 12 having an outer diameter of 64 cm and the lower foundation cloth 13 having an outer diameter of 64 cm, and four vent holes 15 having an inner diameter of 2.5 cm bored in the upper foundation cloth 12. The gas generator fitting hole 18 is bored in the lower foundation cloth 13, and these foundation cloths are sewn at their outer peripheral portions with threads 19 with coating layers 17 and are integrated in a bag form. A foundation cloth for reinforcing 16 is fitted to the inner portions of the vent holes 15 and gas generator fitting hole 18 so as to prevent damage by the high temperature, high pressure and high velocity gas stream.

After the gas generator is fitted to the air bag equipped with the auxiliary bag of the present invention, the air bag is inflated and expanded and its expanding state is photographed and observed by a high speed camera. According to this observation, the auxiliary bag develops while keeping loose contact with the upper foundation cloth 12 and its expansion is not at all observed. However, after the completion of the expansion of the upper foundation cloth 12, expansion and inflation of the auxiliary bag due to the gas gradually emitted via the vent holes 15 is observed without the leakage of the gas to the external space.

As described above, in the impact absorption bag of the present invention, the auxiliary bag is fitted to the ordinary air bag and hence, the vent holes are not opened to the vehicle compartment. Therefore, even when the gas from the gas generator contains mist-like matter or fine particulate matter, the air bag is safe to the occupant. Since not only the impact absorption function by the vent holes is maintained but also the buffer effect by the bag can be maintained relatively for a long time, the present invention can provide economically the impact absorption bag having higher safety.

We claim:

1. An air bag protector for protecting an occupant of a vehicle upon impact of the vehicle, the air bag protector comprising:

a gas generator;

a primary air bag attached to the gas generator for receiving gas generated by the gas generator, the primary air bag having a front surface for contacting an occupant, a back end and top and bottom sides;

a first auxiliary air bag attached to the primary air bag along the top side of the primary air bag for receiving gas from the primary air bag after the primary air bag is fully inflated and an occupant impacts against the front surface of the primary air bag; and a second auxiliary air bag attached to the primary air bag along the bottom side of the primary air bag, the second auxiliary air bag coacting with the first auxiliary air bag to receive gas from the primary air bag after the primary air bag is fully inflated and an occupant impacts against the front surface of the primary air bag;

vent means between the primary air bag and the first and second auxiliary air bags for permitting air to flow from the primary air bag to the first and second auxiliary air bags after an occupant impacts against the primary air bag;

wherein, upon impact of the vehicle, the gas generator generates a gas and inflates the primary air bag to protect an occupant of the vehicle from impacting against the vehicle, the occupant impacts against the front surface of the primary air bag and forces air from the primary air bag through the vent means into the first and second auxiliary air bags.

2. The apparatus of claim 1 wherein the first and second auxiliary air bags are attached to the primary air bag at the back end of the primary air bag.

3. The apparatus of claim 2 wherein the first and second auxiliary air bags are attached to the primary air bag by thread means.

4. The apparatus of claim 2 wherein the first and second auxiliary air bags are comprised of the same material as the primary air bag.

5. An air bag protector for protecting a passenger-side occupant of a vehicle upon impact of the vehicle, the air bag protector comprising:

a gas generator;

a primary air bag having a back end attached to the gas generator for receiving a gas generated by the gas generator, the primary air bag having right and left sides;

a first auxiliary air bag attached to the primary air bag at one of the sides of the primary air bag for receiving gas from the primary air bag after the primary air bag is fully inflated and an occupant impacts against the primary air bag;

a second auxiliary air bag attached to the primary air bag at the other side of the primary air bag that the first auxiliary air bag is attached for receiving gas from the primary air bag after the primary air bag is fully inflated and an occupant impacts against the primary air bag; and vent means between the primary air bag and the auxiliary air bags for permitting air to flow from the primary air bag to the auxiliary air bags after the primary air bag is fully inflated and an occupant impacts against the primary air bag.

6. The apparatus of claim 5 wherein the auxiliary and second auxiliary air bags are attached to the primary air bag near the back end of the primary air bag.

7. The apparatus of claim 6 wherein the auxiliary and second auxiliary air bags are comprised of the same material as the primary air bag.

8. The apparatus of claims 7 wherein the auxiliary and second auxiliary air bags are attached to the primary air bag via thread means.

9. A method of manufacturing an air bag comprising:
forming an air bag material into a substantially round sectional shape;
forming another air bag material into a substantially round sectional shape;
placing the first air bag material onto the second air bag material;
sewing the first air bag material to the second air bag material along the outer peripheries thereof;
applying a solution of unvulcanized rubber to the sewn portion of the first and second air bag materials;
vulcanizing the rubber to integrate the sewn portion of the first and second air bag material;
turning the formed bag inside-out;
boring a hole in the formed air bag;
sewing an auxiliary air bag to the formed air bag about the hole bored in the formed air bag;
applying a solution of unvulcanized rubber to the sewn portion of the auxiliary air bag and the formed air bag; and
vulcanizing the unvulcanized rubber to integrate the formed air bag with the auxiliary air bag.

10. The method of claim 9 further comprising the step of attaching the formed air bag to a gas generator.

* * * * *